United States Patent [19]
Ito et al.

[11] Patent Number: 5,313,327
[45] Date of Patent: May 17, 1994

[54] OCULAR LENS

[75] Inventors: Takayuki Ito; Sachio Hasushita, both of Tokyo, Japan

[73] Assignee: Asahi Kogaku Kogyo Kabushiki Kaisha, Tokyo, Japan

[21] Appl. No.: 795,028

[22] Filed: Nov. 20, 1991

[30] Foreign Application Priority Data

Nov. 30, 1990 [JP] Japan ................ 2-335940
Nov. 30, 1990 [JP] Japan ................ 2-335941
Nov. 30, 1990 [JP] Japan ................ 2-335942

[51] Int. Cl.⁵ .............. G02B 25/00; G02B 13/02; G02B 13/18; G02B 17/00
[52] U.S. Cl. .................... 359/646; 359/647; 359/717; 359/718; 359/726; 354/219
[58] Field of Search ............ 359/646–647, 359/717, 718, 708, 730, 726; 354/219–225

[56] References Cited

U.S. PATENT DOCUMENTS

| | | | |
|---|---|---|---|
| 4,437,750 | 3/1984 | Ikari | 359/646 |
| 4,730,905 | 3/1988 | Takada | 359/646 |
| 4,926,201 | 5/1990 | Mukai et al. | 359/708 |
| 5,034,763 | 7/1991 | Inabata | 359/646 |
| 5,136,427 | 8/1992 | Sugawara | 359/647 |

FOREIGN PATENT DOCUMENTS 616565 7/1935 Fed. Rep. of Germany .
1-142521 6/1989 Japan .

Primary Examiner—Bruce Y. Arnold
Assistant Examiner—James Phan
Attorney, Agent, or Firm—Sughrue, Mion, Zinn, Macpeak & Seas

[57] ABSTRACT

In an ocular lens system for use with a penta-mirror, an ocular lens includes a positive meniscus lens whose concave surface is directed to the pupil side and whose convex surface is directed to the object. The concave and convex surfaces of the positive meniscus lens are aspherical. The two surface are shifted to the pupil side from reference spherical surfaces defined by paraxial radii of curvature.

25 Claims, 16 Drawing Sheets

OCULAR LENS

BACKGROUND OF THE INVENTION

This application is based on and claims priority from Japanese Patent Application Nos. Hei. 2-335940, Hei. 2-335941 and Hei. 2-335942 filed Nov. 30, 1990, respectively, the disclosures of which are incorporated herein by reference.

The present invention relates to an ocular lens system for viewfinders of cameras.

Such a type of ocular lens is disclosed in, for example, Japanese Patent Unexamined Publication No. Hei 1-142521. The lens disclosed in this publication relates to a single positive meniscus lens whose concave surface is directed to the pupil. A distance (backfocus) from a screen (focal plane) to the ocular lens is set at a long distance relative to the focal length in order to meet the requirement of viewfinders for single lens reflex (SLR) cameras and the like (in particular, for finder system having penta-mirror).

However, such a lens suffers from a disadvantage that a difference in diopter between a central portion and a marginal portion of a view field, corresponding to a curvature of field of the focusing lens system, and astigmatism would be increased. Also, since the aspherical effect is small, a height of an off-axis marginal ray is increased, so that it is impossible to make the finder system small in size. Furthermore, a thickness of the finder system is large, it would be difficult to use an inexpensive plastic for the material of the lens. Thus, the cost for the lens would be increased.

SUMMARY OF THE INVENTION

An object of the invention is to provide an ocular lens system in which a long backfocus may be ensured with a simple lens arrangement, and a thickness of the lens may be reduced thereby reducing a height of an off-axis marginal ray.

According to the invention, there is provided an ocular lens system comprising a single positive meniscus lens having aspherical surfaces on both sides, wherein a concave surface of said meniscus lens is directed to the pupil. The meniscus lens is disposed on a position closest to the pupil, and the aspherical surfaces are shifted toward the pupil from reference surfaces defined by paraxial radii of curvature.

According to another aspect of the invention, there is provided an ocular lens system comprising, in order from the pupil side, a negative meniscus lens whose concave surface is directed to the pupil side and a positive meniscus lens whose convex surface is directed to the screen side, at least the convex surface of the positive meniscus lens and the concave surface of the negative meniscus lens being aspherical, the aspherical surfaces being shifted to the pupil side from reference spherical surfaces defined by paraxial radii of curvature.

According to the invention, there is provided an ocular lens system comprising, in order from the pupil side, a positive meniscus lens whose concave surface is directed to the pupil side and whose convex surface is directed to the object side, and a negative meniscus lens wherein at least the convex surface and the concave surface of said positive meniscus lens are aspherical, and each of the aspherical surfaces is shifted toward the pupil from the reference spherical surface defined by a paraxial radius of curvature.

According to still another embodiment of the invention, there is provided an ocular lens system comprising a single positive meniscus lens having aspherical surfaces on both sides, wherein a concave surface of the meniscus lens is directed to the pupil, the meniscus lens is disposed on a position closest to the pupil, and the aspherical surfaces are shifted toward the pupil from reference surfaces defined by paraxial radii of curvature.

An ocular lens system of the invention may be used with a penta-mirror.

DESCRIPTION OF THE PREFERRED EMBODIMENTS

The present invention will now be described with reference to the accompanying drawings.

Figure 1:
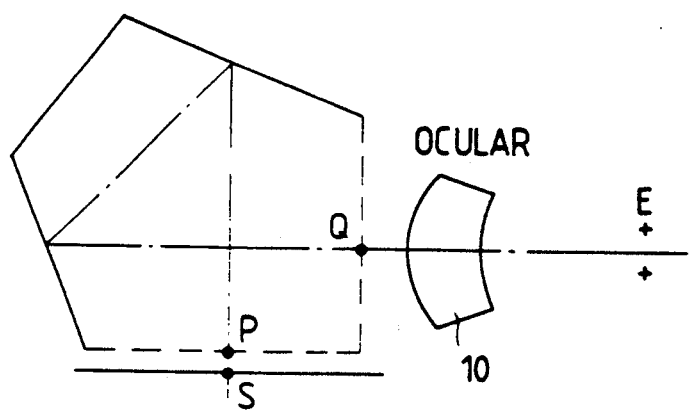
FIG. 1 is an illustration of a finder system for an SLR camera to which an ocular system according to the present invention is applied.
Figure 2:
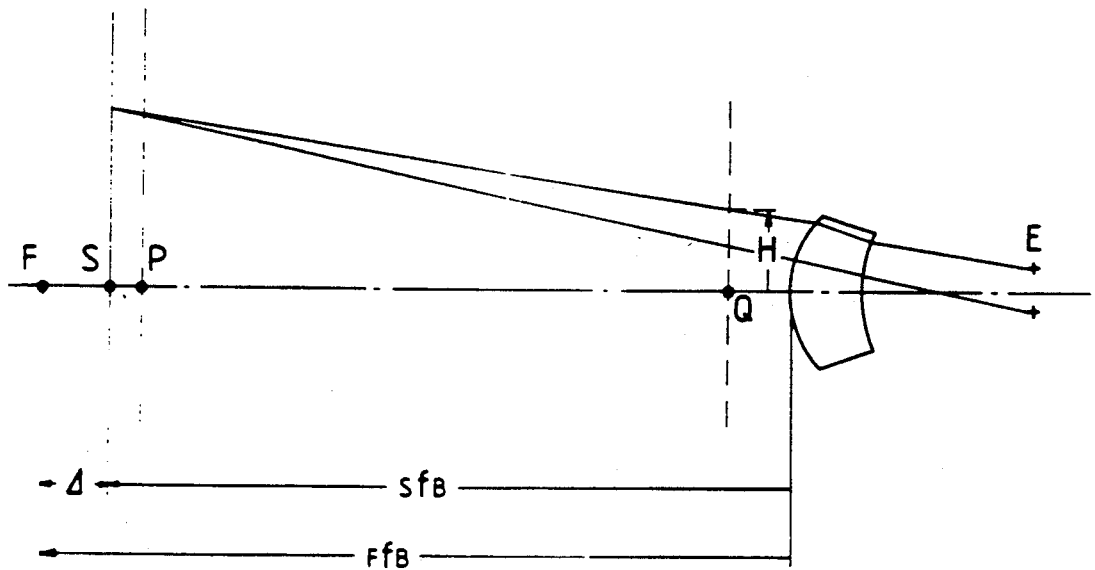
FIG. 2 shows an optical path obtained by developing the penta-mirror shown in FIG. 1.

FIGS. 1 and 2, reference character S denotes screen, P denotes an end face of a penta-mirror on the screen side, Q denotes an end face thereof on the ocular lens side, E denotes an eye point, F denotes a front focal point, FfB denotes a distance from the front focal point to the ocular lens, Δ denotes an interval between the screen and the front focal point F and H is a height at which a marginal ray of a maximum off-axis ray flux is passed at the end face of the penta-mirror on the ocular lens side.

The ocular lens is composed of a single positive meniscus lens 10 having aspherical surfaces on both sides. The concave surface of asphericity is directed to the pupil. These aspherical surfaces are shifted toward the pupil from reference spherical surfaces defined by a paraxial radii of curvature.

By using the positive meniscus lens having a concave surface facing the pupil, the focal length of the ocular lens may be small (that is, a finder magnification is increased), and the backfocus may be increased. Both surfaces of the lens are curved toward the pupil from the reference spherical surfaces, so that it is possible to suppress the height H of the maximum off-axis ray flux and the lens diameter while keeping a sufficient backfocus.

The above-described aspherical surfaces should preferably meet the following conditions (1) and (2):

$$0.001 < \Delta X_s / f < 0.009 \quad (1)$$

$$0.001 < \Delta X_e / f < 0.009 \quad (2)$$

where $\Delta X_s$ is the distance from the reference spherical surface to the lens surface of the co-ordinate of $Y = 0.112f$ on the screen side; $\Delta X_e$ is the distance from the reference spherical surface to the lens surface at the co-ordinate of $Y = 0.86f$ on the pupil side; Y is the height from the optical axis; and f is the focal length of the ocular lens.

The conditions (1) and (2) relate to a contour of the aspherical concave and convex surfaces. If the upper limit of each condition is exceeded, the asphericity would be excessive to increase an amount of flare of the off-axis ray so that the observed image would become worse even if the eye is slightly shifted. Also, when the asphericity is excessive, a rate of degradation in performance relative to a manufacture error is high, and it is difficult to make the lens.

On the other hand, if the lower limits of condition (1), (2) are exceeded, the aspherical effect is small, and it is impossible to sufficiently suppress the height of the maximum off-axis ray flux. Accordingly, it is necessary to increase a size of the penta-mirror.

Furthermore, it is preferable that the ocular lens meet the following conditions (3), (4) and (5);

$$< 12 < (rs + re)/(rs - re) < -3 \quad (3)$$

$$0.15 < re/f < 0.35 \quad (4)$$

$$0.05 < d/f < 0.15 \quad (5)$$

where rs is the paraxial radius of curvature of the surface on the screen side; re is the paraxial radius of curvature of the surface on the pupil side; and d is the thickness of the lens.

The condition (3) relates to a contour of the ocular lens. If the upper limit of the condition (3) is exceeded, the curvature of the lens is small, so that it is difficult to increase the backfocus. If the lower limit of the condition (3) is exceeded, the refractive power of both surfaces is excessive, so that it is difficult to effect the aberration compensation.

The condition (4) relates to the radius of curvature of the surface on the pupil side. If the upper limit of the condition (4) is exceeded, it is difficult to increase the backfocus while keeping the short focal length. If the lower limit of the condition (4) is exceeded, the flare amount of the off-axis ray is increased, and at the same time, actually, the eye point is small in physical size since the radius of curvature of the surface on the pupil side is small.

The condition (5) relates to the thickness of the lens. If the upper limit of the condition (5) is exceeded, it is difficult to use a plastic lens since the thickness of the lens is increased. In addition, the lens diameter is increased. If the lower limit is exceeded, it is necessary to decrease the radius of curvature of each lens surface to shorten the focal length. Thus, it is difficult to effect the aberration compensation.

EXAMPLE 1

Figure 3:
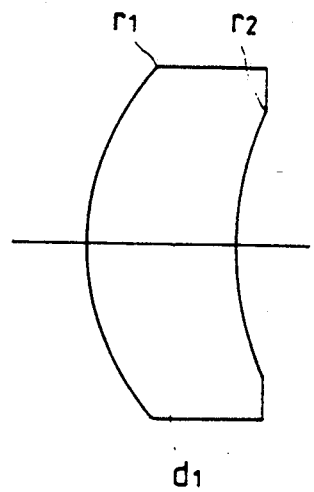
FIG. 3 is a cross-sectional view showing a first example of the invention.
Figure 4:
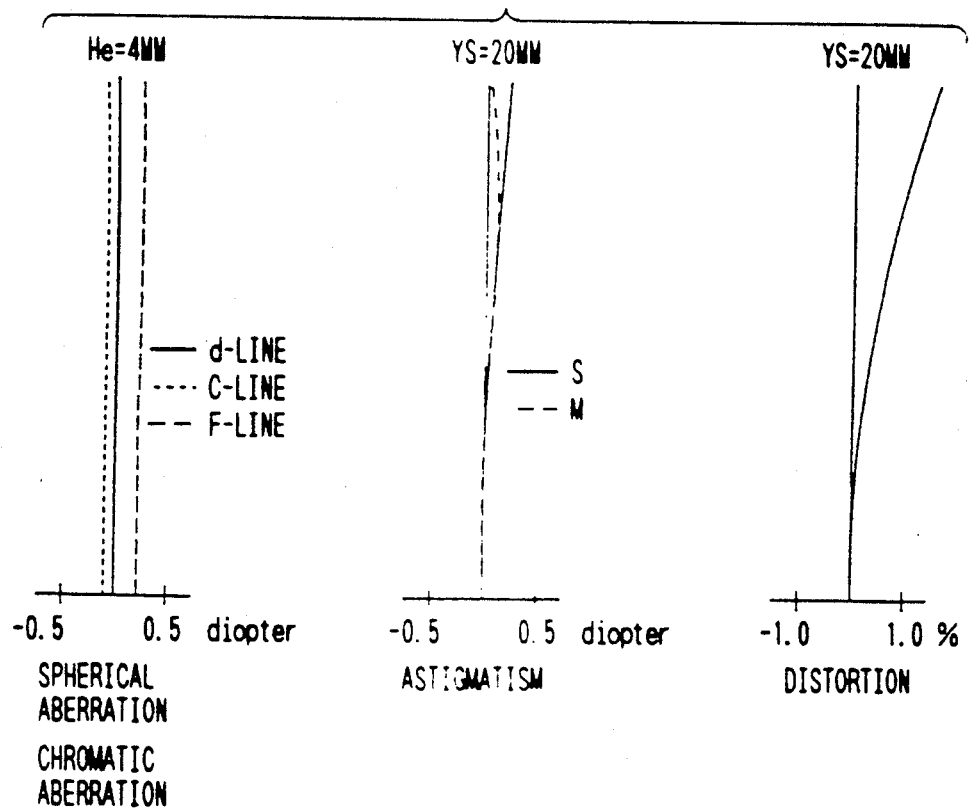
FIG. 4 is graphs showing aberrational curves according to the first example.

FIG. 3 shows Example 1 of the invention. Specific numerical data thereof are shown in Table 1, and the aberrations thereof are shown in FIG. 4. In the table, reference character f denotes the focal length, ds denotes the distance from the screen S to the first surface, de is the distance from the second surface to the eye point E, r is the radius of curvature of the paraxial ray of each lens surface, d is the lens thickness, n is the refractive index on d-line of the lens, and v is the Abbe number. The unit for the diopter is D.

In the aberration graphs, character He denotes the height of the on-axis ray flux at the pupil, and Ys denotes the height thereof at the screen. The diopter of the aberration shows a difference from the reference diopter.

The aspherical surface is represented by the following equation:

$$X = \frac{CY^2}{1 + \sqrt{1 - (1 + K)C^2 Y^2}} + A_4 Y^4 + A_6 Y^6 + A_8 Y^8 + A_{10} Y^{10}$$

where X is the distance from a tangential flat plane of the aspherical apex at the co-ordinate on the aspherical surface where the height thereof is Y from the optical axis; C is the curvature (1/r) of the spherical apex; K is the conical coefficient; and A4 to A10 are the aspherical coefficients of fourth to tenth order. The specific values of these coefficients are shown in a lower part of Table 1.

TABLE 1

| f = 70.0 | diopter = −0.91D | ds = 74.3 | de = 15.0 |
|---|---|---|---|
| Surface No. | r | d | n | ν |
| 1 | 12.928 | 6.443 | 1.49186 | 57.4 |
| 2 | 17.303 | | | |

| Aspherical Coefficient | |
|---|---|
| 1st Surface | 2nd Surface |
| K = −0.38050 | K = −1.16760 |
| A4 = 5.02201 × 10$^{-05}$ | A4 = 1.40336 × 10$^{-04}$ |
| A6 = 5.77226 × 10$^{-07}$ | A6 = 1.35307 × 10$^{-06}$ |
| A8 = −3.27165 × 10$^{-09}$ | A8 = −2.09132 × 10$^{-09}$ |
| A10 = 6.74241 × 10$^{-11}$ | A10 = 3.22754 × 10$^{-10}$ |

EXAMPLE 2

Figure 5:
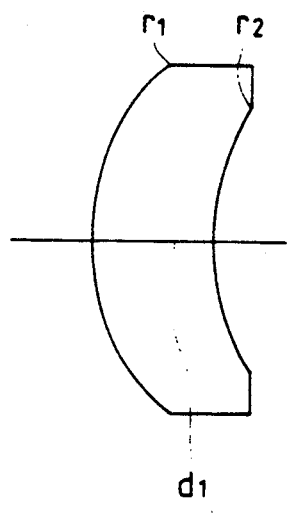
FIG. 5 is a cross-sectional view showing a second example of the invention.

FIG. 5 shows Example 2 of the invention.

Figure 6:
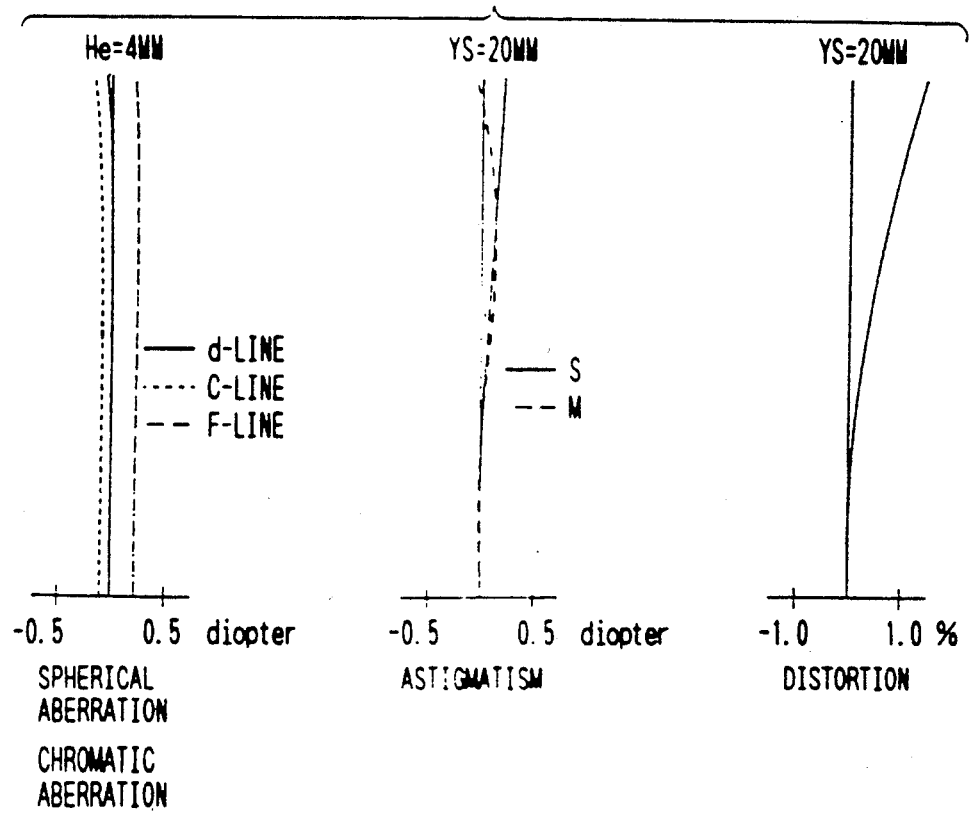
FIG. 6 is graphs showing aberrational curves according to the second example.

Its numerical data are shown in Table 2 and the aberration curves are shown in FIG. 6.

TABLE 2

| f = 70.0 | diopter = −0.99D | ds = 74.3 | de = 15.0 |
|---|---|---|---|
| Surface No. | r | d | n | ν |
| 1 | 11.312 | 5.448 | 1.49176 | 57.4 |
| 2 | 14.155 | | | |

| Aspherical Coefficient | |
|---|---|
| 1st Surface | 2nd Surface |
| K = −0.23968 | K = −1.02543 |
| A4 = 5.33673 × 10$^{-05}$ | A4 = 1.86370 × 10$^{-04}$ |
| A6 = 1.24400 × 10$^{-06}$ | A6 = 3.45419 × 10$^{-06}$ |
| A8 = −1.41805 × 10$^{-08}$ | A8 = −4.55142 × 10$^{-08}$ |
| A10 = 2.47907 × 10$^{-10}$ | A10 = 1.50006 × 10$^{-09}$ |

EXAMPLE 3

Figure 7:
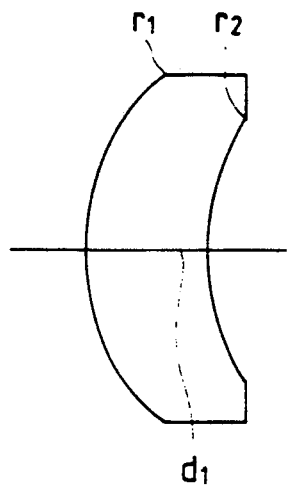
FIG. 7 is a cross-sectional view showing a third example of the invention.

FIG. 7 shows Example 3 of the invention.

Figure 8:
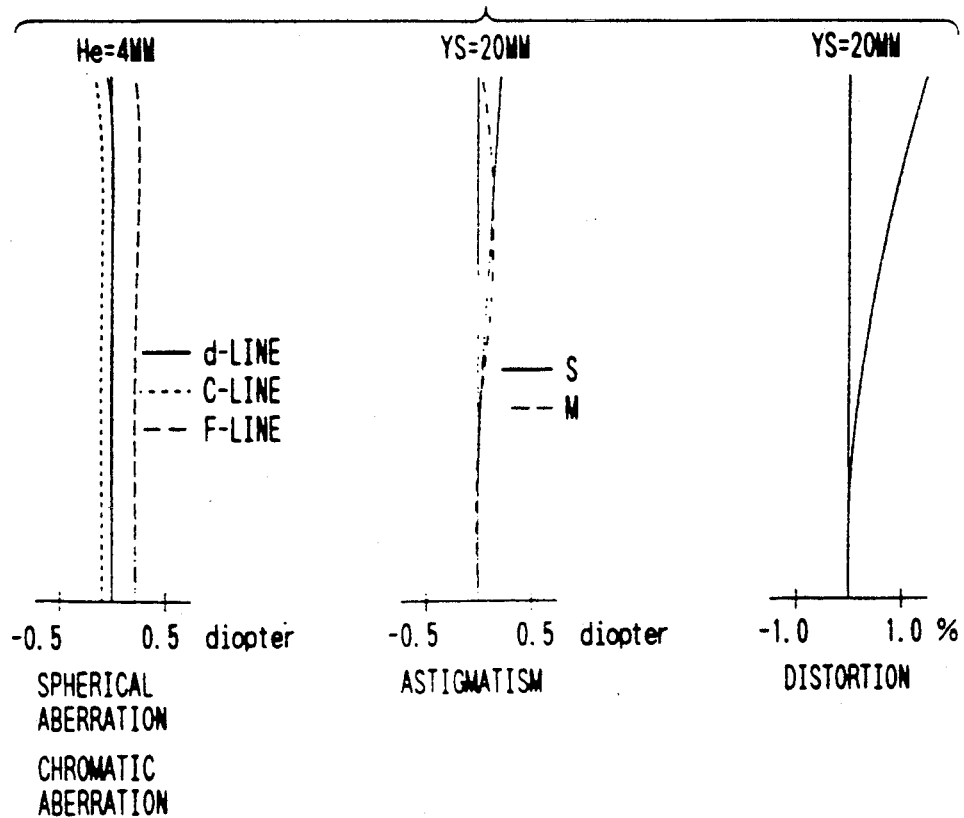
FIG. 8 is a graphs showing aberrational curves according to the third example.

Specific numerical data thereof are shown in Table 3 and its aberration curves are shown in FIG. 8.

TABLE 3

| f = 70.0 | diopter = −0.99D | ds = 74.3 | de = 15.0 |
|---|---|---|---|
| Surface No. | r | d | n | ν |
| 1 | 11.174 | 5.414 | 1.49176 | 57.4 |
| 2 | 13.903 | | | |

| Aspherical Coefficient | |
|---|---|
| 1st Surface | 2nd Surface |
| K = −0.17303 | K = −0.74873 |
| A4 = 5.92029 × 10$^{-05}$ | A4 = 2.04441 × 10$^{-04}$ |
| A6 = 7.88034 × 10$^{-07}$ | A6 = 1.49110 × 10$^{-06}$ |
| A8 = −5.20015 × 10$^{-09}$ | A8 = 2.99323 × 10$^{-08}$ |
| A10 = 2.03354 × 10$^{-10}$ | A10 = 7.26328 × 10$^{-10}$ |

The relationship between each condition and each Example is shown below.

| | Examples | | |
|---|---|---|---|
| | 1 | 2 | 3 |
| (1) | 0.0031 | 0.0053 | 0.0057 |
| (2) | 0.0032 | 0.0050 | 0.0054 |
| (3) | −6.91 | −8.96 | −9.19 |
| (4) | 0.247 | 0.202 | 0.199 |
| (5) | 0.092 | 0.078 | 0.077 |

Incidentally, since −1 diopter is sued as the reference diopter D normally in the ocular lens, the following relationship is given:

$$D \approx f^2/1000\Delta = -1$$

In Example 1, $\Delta \approx 5$.

As described above, according to the present invention, it is possible to provide an ocular lens which has a short focal length, a long backfocus, a small lens diameter, and a short height of the marginal ray.

Figure 9:
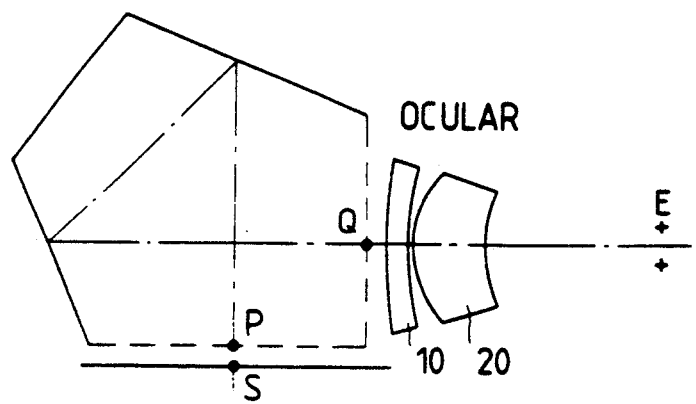
FIG. 9 is an illustration of a finder system for an SLR camera to which another ocular system according to the present invention is applied.
Figure 10:
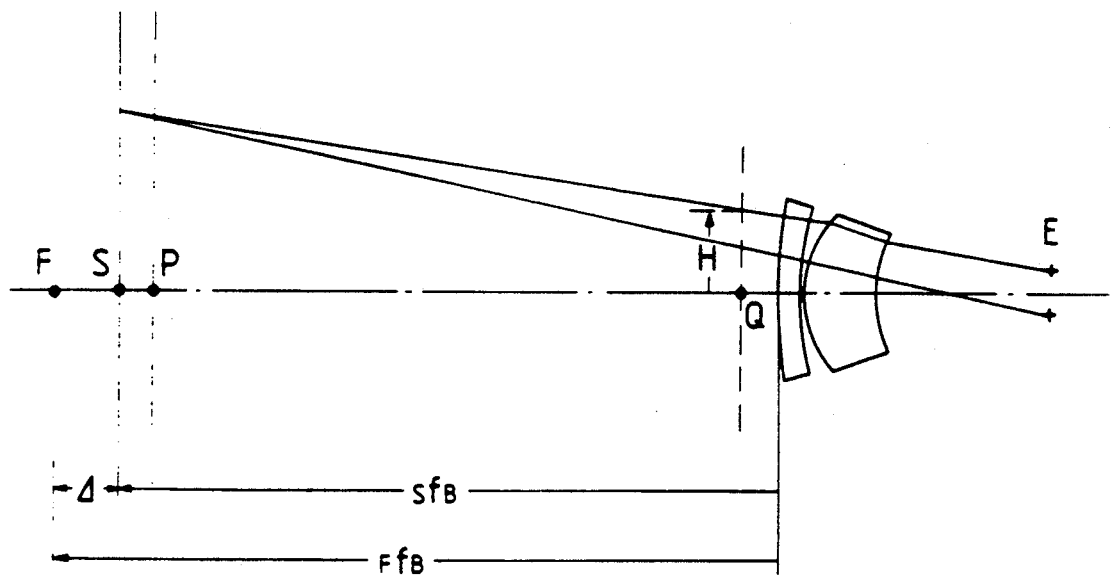
FIG. 10 shows an optical path obtained by developing the penta-mirror shown in FIG. 9.

FIGS. 9 and 10 show another embodiment of the invention. In this embodiment, the same reference characters are used to indicate the same parts or elements as those used in the previous embodiment. In this embodiment, the ocular lens system is composed, in order from the pupil side, of a positive meniscus lens 20 whose concave surface is directed to the pupil, and a negative meniscus lens 10 whose convex surface is directed to the screen. The concave surface of the positive meniscus lens 20 and the convex surface of the negative meniscus lens 10 are aspherical. These aspherical surfaces are shifted toward the pupil from the reference spherical surfaces defined by the paraxial radii of curvature. With such an arrangement, it is possible to ensure substantially the same effect as that of the previous embodiment.

The aspherical surfaces should preferably meet the following conditions (1') and (2'):

$$0.001 < \Delta X_n/f < 0.009 \quad (1')$$

$$0.001 < \Delta X_p/f < 0.009 \quad (2')$$

where $\Delta X_n$ is the distance from the reference spherical surface, at the marginal portion of the convex surface of the negative meniscus lens 10, to the lens surface; $\Delta X_p$ is the distance from the reference spherical surface, at the marginal portion of the concave surface of the positive meniscus lens, to the lens surface; and f is the overall focal length.

The effects of the conditions (1') and (2') are substantially the same effect as the conditions (1) and (2), respectively.

Also, the positive meniscus lens should preferably meet the conditions (3'), (4') and (5');

$$-7 < (r_{ps} + r_{pe})/(r_{ps} - r_{pe}) < -2 \quad (3')$$

$$0.15 < r_{pe}/f < 0.37 \quad (4')$$

$$0.03 < d_p/f < 0.15 \quad (5')$$

where rps is the paraxial curvature radius of the surface of the positive meniscus lens on the screen side; rpe is the paraxial curvature radius of the surface of the positive meniscus lens o the pupil side; and dp is the lens thickness of the positive meniscus lens.

The condition (3') relates to the positive meniscus lens contour. If the upper limit is exceeded, the curvature of the lens is small, it would be difficult to suppress the height of the maximum off-axis ray flux and it is also difficult to increase the backfocus. If the lower limit is exceeded, the power of both surfaces is excessive, so that it is difficult to effect the aberration compensation, and a high order flare is generated.

The conditions (4') and (5') further define the contour of the positive meniscus lens. The condition (4') relates to the curvature radius of the concave surface on the pupil side. The condition (5') relates to the thickness of the positive meniscus lens. If the upper limit of the condition (4') is exceeded, the focal length is increased by increasing the backfocus, so that the magnification becomes small. Also, if the lower limit of the condition (4') is exceeded, the flare of the off-axis ray is increased, and at the same time, the actual eye point is small since the radius of curvature on the pupil side is small.

When the upper limit of the condition (5') is exceeded, the lens thickness and the lens diameter are increased, which does not lead to the miniaturization. If the lower limit of the condition (5') is exceeded, it is necessary to shorten the curvature radius of each lens surface in order to shorten the focal length. As a result, it is difficult to compensate for the aberration.

The negative meniscus lens should preferably meet the following conditions (6) and (7):

$$3 < (rns + rne)/(rns - rne) < 15 \quad (6)$$

$$0.05 < f/|fn| < 0.9 \quad (7)$$

where rns is the paraxial curvature radius of the surface, on the screen side, of the negative meniscus lens; rne is the paraxial curvature radius of the surface, on the pupil side, of the negative meniscus lens; and fn is the focal length of the negative meniscus lens.

The condition (6) relates to a lens contour of the negative meniscus lens located on the object side. In order to compensate for aberration generated in the positive meniscus lens having the large curvature meeting the condition (3'), it is preferable to direct the convex surface to the object side. However, if the upper limit of the condition (6) is exceeded, the curvature of the lens is small so that the aberration generated in the positive meniscus lens is insufficiently compensated for. Inversely, if the lower limit is exceeded, the compensation is excessive.

The condition (7) defines a refractive power of the negative meniscus lens. If the lower limit of the condition (7) is exceeded, it is impossible to effect the compensation for chromatic aberration with the negative meniscus lens. If the upper limit of the condition (7) is exceeded, the power of the negative meniscus lens is excessive, and thus a high order spherical aberration and a coma aberration is generated. It is therefore difficult to suppress the generation of flare.

Incidentally, in Examples 4 to 11, to positive meniscus lens is made of acrylic resin, and the negative meniscus lens is made of polycarbonate.

EXAMPLE 4

Figure 11:
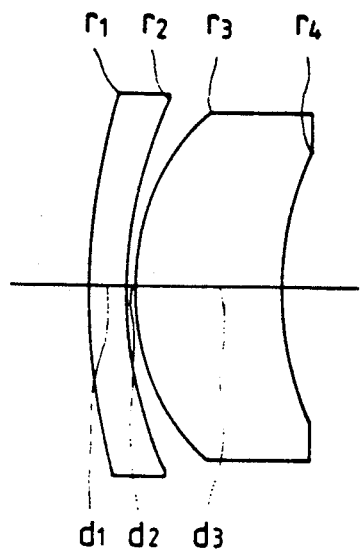
FIG. 11 is a cross-sectional view showing a fourth example of the invention.
Figure 12:
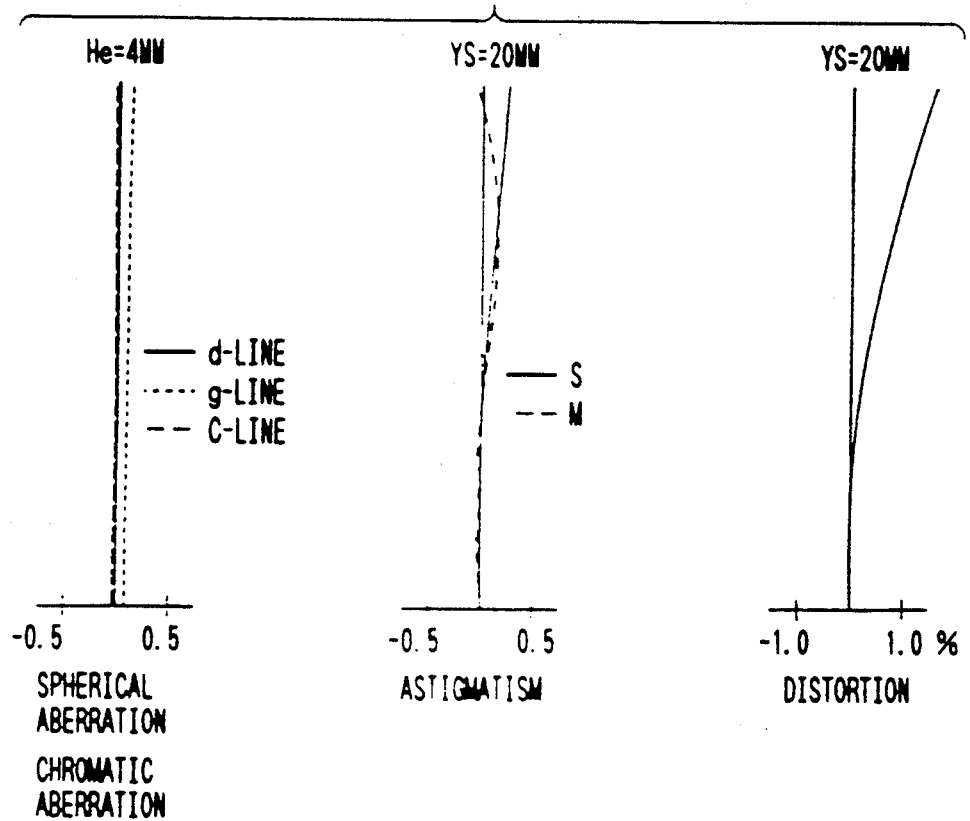
FIG. 12 is graphs showing aberrational curves according to the fourth example.

FIG. 11 shows Example 4. Its numerical data is shown in Table 4 and its aberration curves are shown in FIG. 12.

TABLE 4

| f = 70.0 | diopter = −0.99D | ds = 72.2 mm | de = 15 mm |   |
|---|---|---|---|---|
| Surface No. | r | d | n | ν |
| 1 | 28.571 | 1.736 | 1.58547 | 29.9 |
| 2 | 18.577 | 0.386 | | |
| 3 | 11.277 | 6.757 | 1.49176 | 57.4 |

TABLE 4-continued

| 4 | 22.545 | | | |
|---|---|---|---|---|
| | Aspherical Coefficient | | | |
| 3rd Surface | | 4th Surface | | |
| K = −0.86853 | | K = −0.49528 | | |
| A4 = 8.77325 × 10⁻⁰⁵ | | A4 = 1.22501 × 10⁻⁰⁴ | | |
| A6 = 1.56642 × 10⁻⁰⁶ | | A6 = 3.46939 × 10⁻⁰⁶ | | |
| A8 = −1.89209 × 10⁻⁰⁸ | | A8 = −6.51549 × 10⁻⁰⁸ | | |
| A10 = 2.67253 × 10⁻¹⁰ | | A10 = 1.47454 × 10⁻⁰⁹ | | |

EXAMPLE 5

Figure 13:
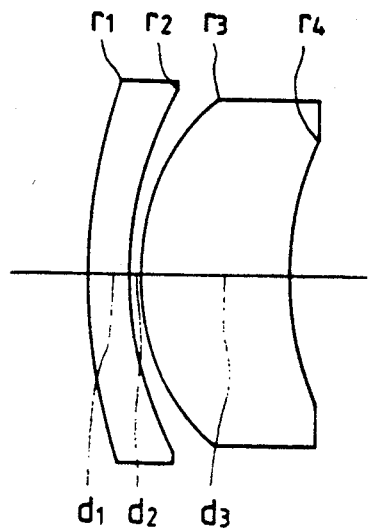
FIG. 13 is a cross-sectional view showing a fifth example of the invention.

FIG. 13 shows Example 5.

Figure 14:
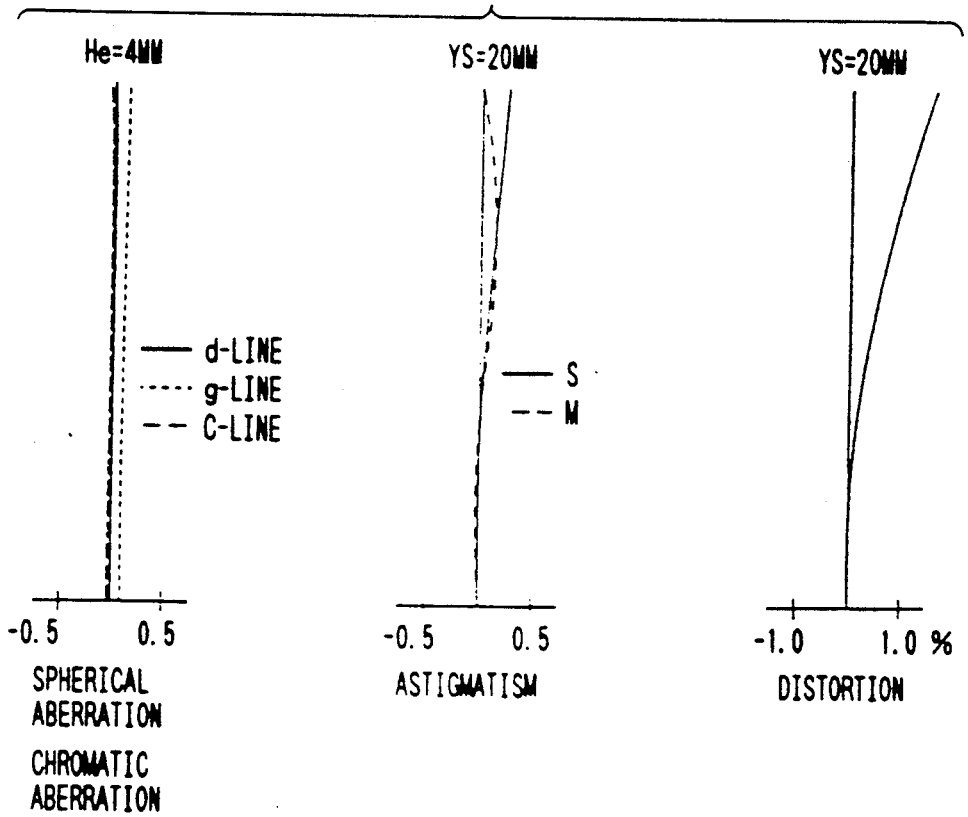
FIG. 14 is graphs showing aberrational curves according to the fifth example.

Its numerical data is shown in Table 5, and its aberration curves are shown in FIG. 14.

TABLE 5

| f = 70.0 | diopter = −1.03D | ds = 72.2 mm | de = 15.0 mm |   |
|---|---|---|---|---|
| Surface No. | r | d | n | ν |
| 1 | 26.930 | 1.896 | 1.58547 | 29.9 |
| 2 | 17.816 | 0.401 | | |
| 3 | 11.166 | 6.659 | 1.49176 | 57.4 |
| 4 | 22.078 | | | |
| | Aspherical Coefficient | | | |
| 3rd Surface | | 4th Surface | | |
| K = −0.81156 | | K = −0.47921 | | |
| A4 = 9.16056 × 10⁻⁰⁵ | | A4 = 1.35687 × 10⁻⁰⁴ | | |
| A6 = 1.29889 × 10⁻⁰⁶ | | A6 = 2.56487 × 10⁻⁰⁶ | | |
| A8 = −1.26647 × 10⁻⁰⁸ | | A8 = −3.08434 × 10⁻⁰⁸ | | |
| A10 = 2.43287 × 10⁻¹⁰ | | A10 = 1.21149 × 10⁻⁰⁹ | | |

EXAMPLE 6

Figure 15:
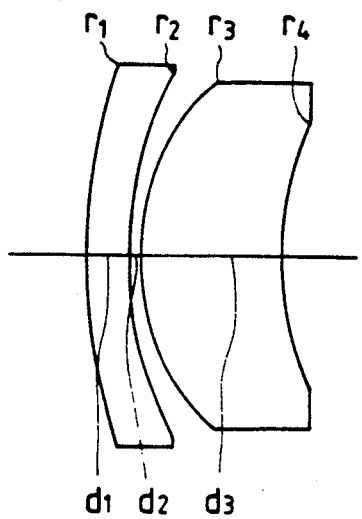
FIG. 15 is a cross-sectional view showing a sixth example of the invention.

FIG. 15 shows Example 6.

Figure 16:
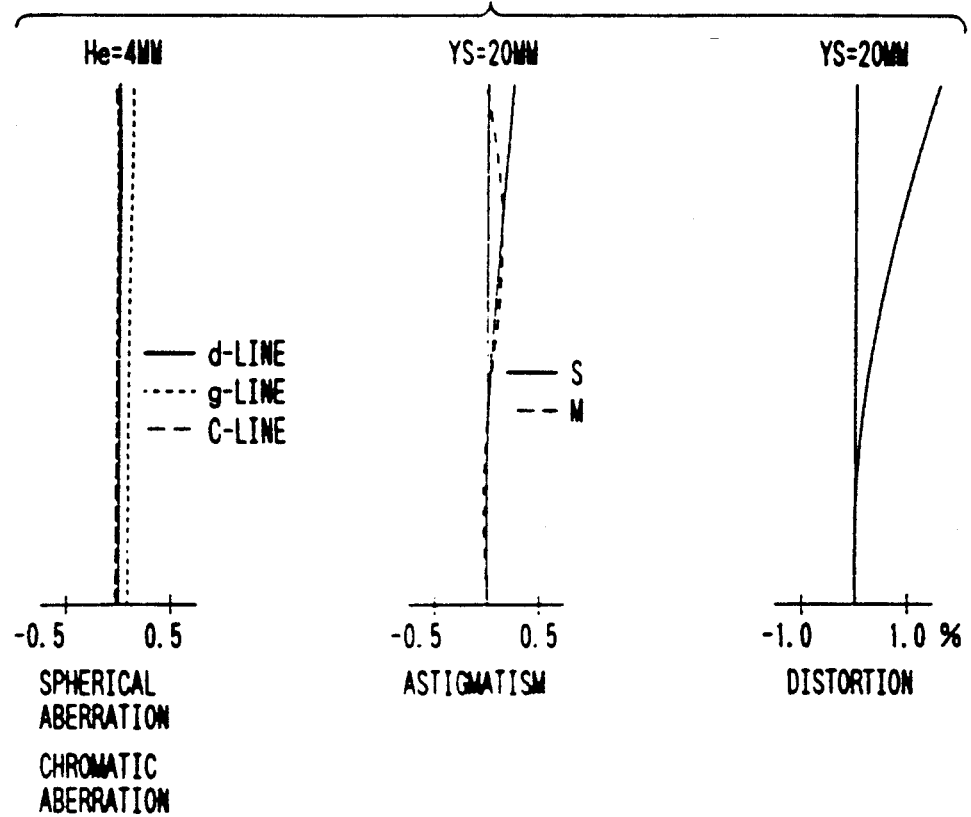
FIG. 16 is a graphs showing aberrational curves according to the sixth example.

Its numerical data is shown in Table 6, and its aberration curves are shown in FIG. 16.

TABLE 6

| f = 70.0 | diopter = −0.98D | ds = 72.2 mm | de = 15.0 mm |   |
|---|---|---|---|---|
| Surface No. | r | d | n | ν |
| 1 | 27.121 | 1.949 | 1.58547 | 29.9 |
| 2 | 17.803 | 0.422 | | |
| 3 | 11.102 | 6.483 | 1.49176 | 57.4 |
| 4 | 22.072 | | | |
| | Aspherical Coefficient | | | |
| 3rd Surface | | 4th Surface | | |
| K = −0.80094 | | K = −0.45484 | | |
| A4 = 9.32211 × 10⁻⁰⁵ | | A4 = 1.38925 × 10⁻⁰⁴ | | |
| A6 = 1.41390 × 10⁻⁰⁶ | | A6 = 2.66103 × 10⁻⁰⁶ | | |
| A8 = −1.46310 × 10⁻⁰⁸ | | A8 = −3.04713 × 10⁻⁰⁸ | | |
| A10 = 2.77330 × 10⁻¹⁰ | | A10 = 1.23116 × 10⁻⁰⁹ | | |

EXAMPLE 7

Figure 17:
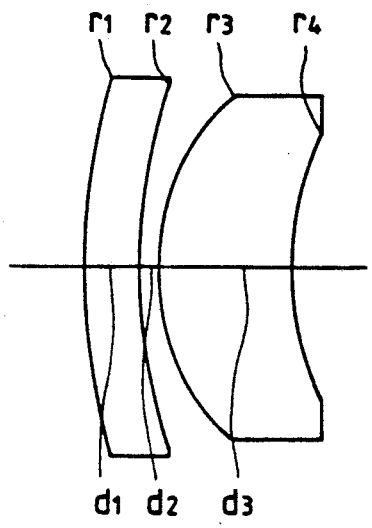
FIG. 17 is a cross-sectional view showing a seventh example of the invention.

FIG. 17 shows Example 7.

Figure 18:
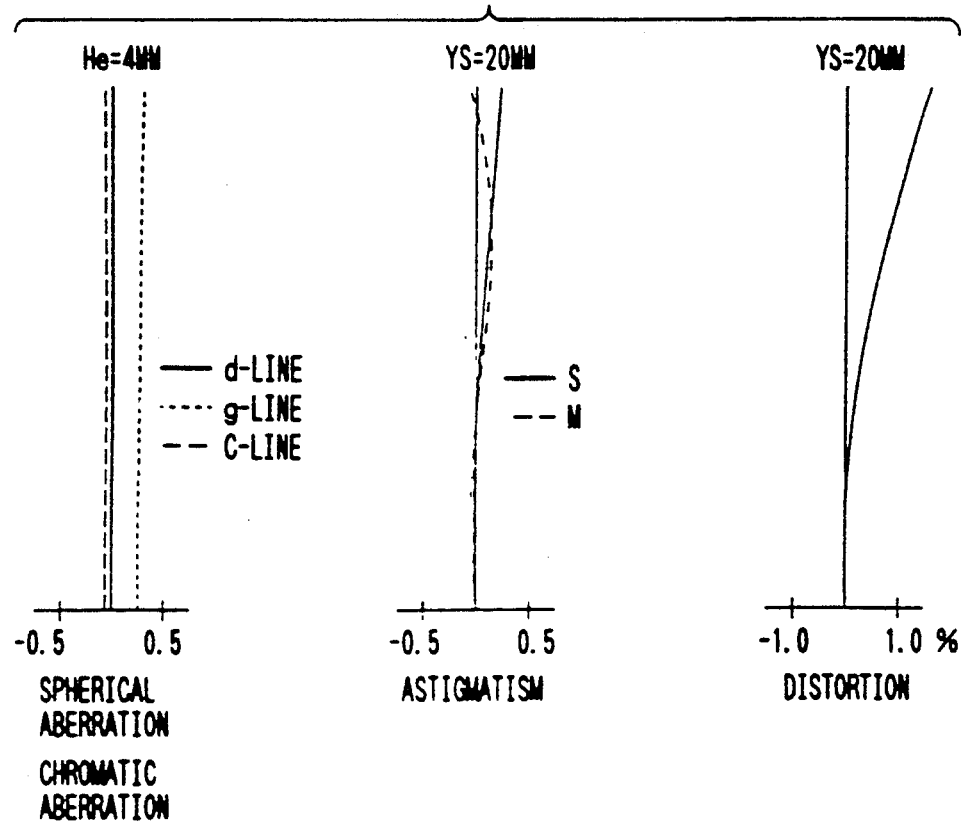
FIG. 18 is a graphs showing aberrational curves according to the seventh example.

Its numerical data and aberration curves are shown in Table 7 and FIG. 18, respectively.

TABLE 7

| f = 70.0 | diopter = −0.91D | ds = 72.2 mm | de = 15.0 mm |   |
|---|---|---|---|---|
| Surface No. | r | d | n | ν |
| 1 | 30.632 | 2.401 | 1.58547 | 29.9 |
| 2 | 24.058 | 0.960 | | |
| 3 | 11.745 | 5.762 | 1.49176 | 57.4 |
| 4 | 18.636 | | | |
| | Aspherical Coefficient | | | |
| 3rd Surface | | 4th Surface | | |
| K = −0.45925 | | K = −1.23910 | | |
| A4 = 6.18334 × 10⁻⁰⁵ | | A4 = 1.48906 × 10⁻⁰⁴ | | |
| A6 = 1.71811 × 10⁻⁰⁶ | | A6 = 4.10280 × 10⁻⁰⁶ | | |

TABLE 7-continued

| | |
|---|---|
| $A8 = -2.36754 \times 10^{-08}$ | $A8 = -8.66993 \times 10^{-08}$ |
| $A10 = 3.27419 \times 10^{-10}$ | $A10 = 1.83833 \times 10^{-09}$ |

EXAMPLE 8

Figure 19:
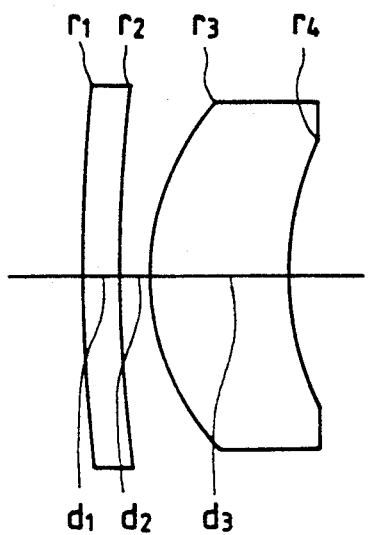
FIG. 19 is a cross-sectional view showing an eighth example of the invention.
Figure 20:
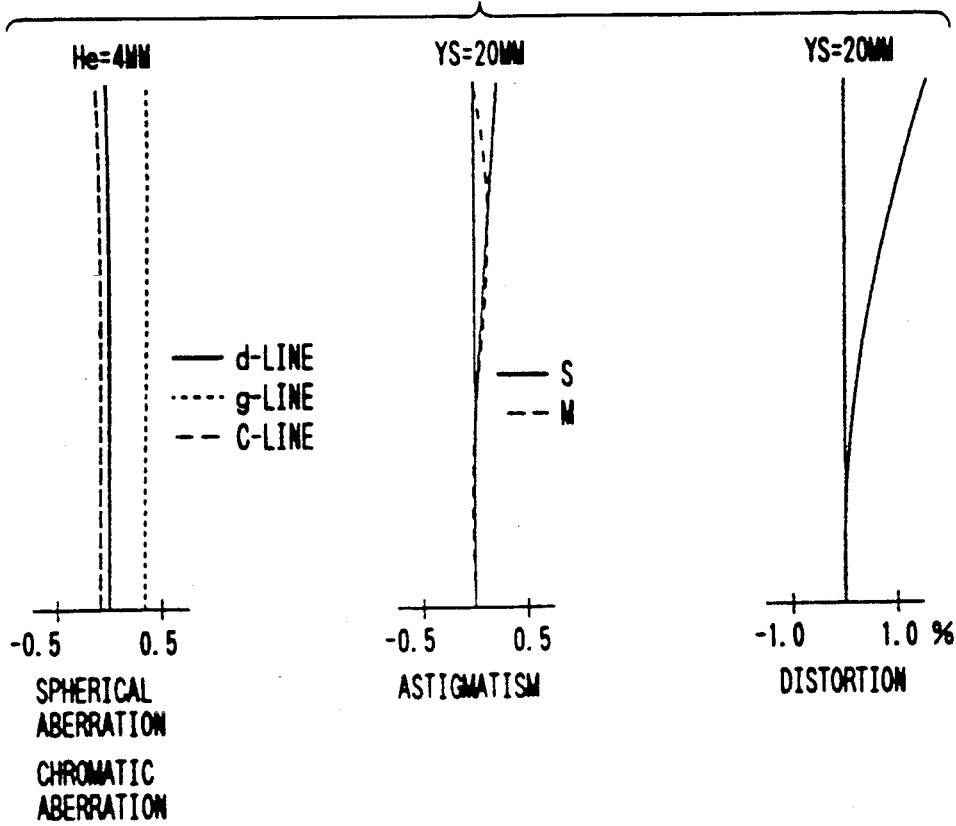
FIG. 20 is graphs showing aberrational curves according to the eighth example.

FIG. 19 shows Example 8 of the invention.
Its numerical data is shown in Table 8 and its aberration curves are shown in FIG. 20.

TABLE 8

| f = 70.0 | diopter = −0.91D | ds = 72.2 mm | de = 15.0 mm |
|---|---|---|---|
| Surface No. | r | d | n | ν |

| Surface No. | r | d | n | ν |
|---|---|---|---|---|
| 1 | 88.312 | 1.730 | 1.58547 | 29.9 |
| 2 | 68.517 | 1.144 | | |
| 3 | 12.178 | 6.198 | 1.49176 | 57.4 |
| 4 | 17.099 | | | |

Aspherical Coefficient

| 3rd Surface | 4th Surface |
|---|---|
| $K = -0.43713$ | $K = -1.05488$ |
| $A4 = 5.82148 \times 10^{-05}$ | $A4 = 1.51704 \times 10^{-04}$ |
| $A6 = 1.06014 \times 10^{-06}$ | $A6 = 2.76730 \times 10^{-06}$ |
| $A8 = -1.08144 \times 10^{-08}$ | $A8 = -4.01229 \times 10^{-08}$ |
| $A10 = 1.62670 \times 10^{-10}$ | $A10 = 1.04478 \times 10^{-09}$ |

EXAMPLE 9

Figure 21:
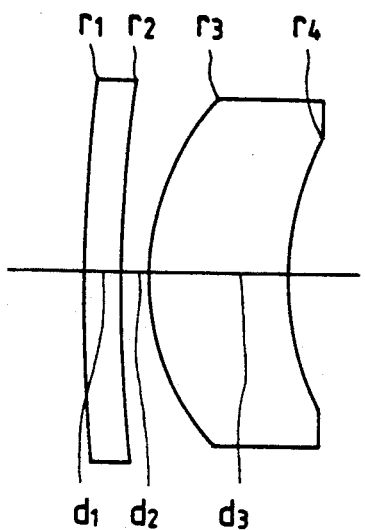
FIG. 21 is a cross-sectional view showing a ninth example of the invention.
Figure 22:
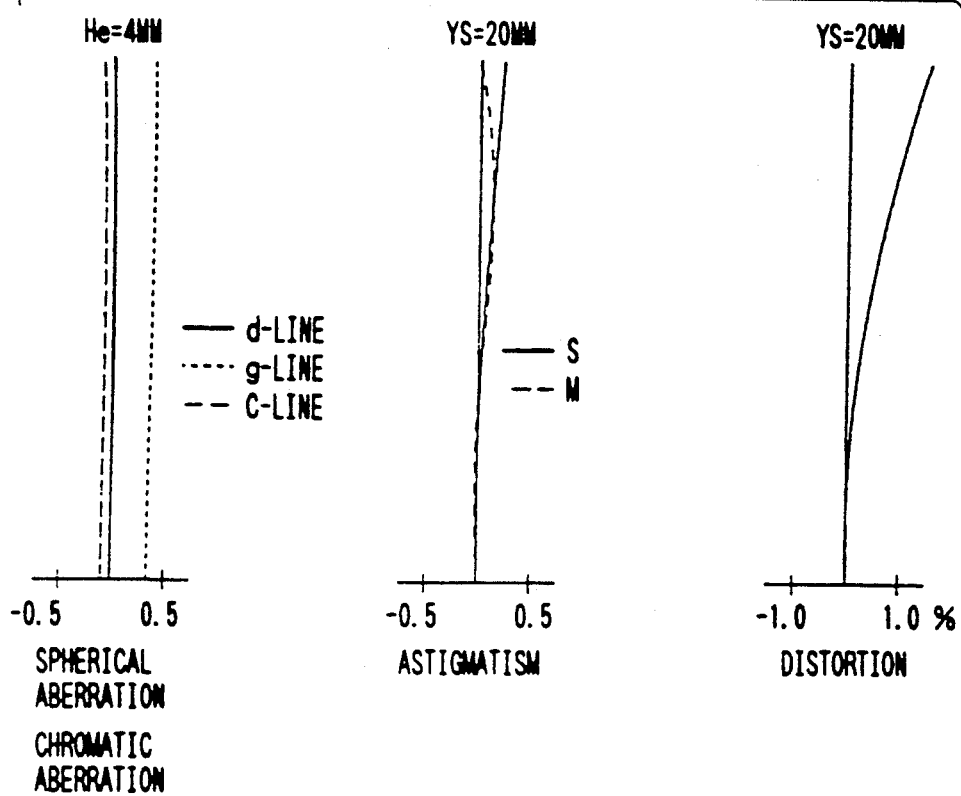
FIG. 22 is graphs showing aberrational curves according to the ninth example.

FIG. 21 shows Example 9 of the invention.
Its numerical data is shown in Table 9 and aberration curves are shown in FIG. 22.

TABLE 9

| f = 70.0 | diopter = −0.95D | ds = 72.2 | de = 15.0 |
|---|---|---|---|

| Surface No. | r | d | n | ν |
|---|---|---|---|---|
| 1 | 84.242 | 1.731 | 1.69895 | 30.1 |
| 2 | 68.463 | 1.144 | | |
| 3 | 12.186 | 6.202 | 1.49176 | 57.4 |
| 4 | 17.109 | | | |

Aspherical Coefficient

| 3rd Surface | 4th Surface |
|---|---|
| $K = -0.43713$ | $K = -1.05488$ |
| $A4 = 5.81059 \times 10^{-05}$ | $A4 = 1.51420 \times 10^{-04}$ |
| $A6 = 1.05684 \times 10^{-06}$ | $A6 = 2.75868 \times 10^{-06}$ |
| $A8 = -1.07673 \times 10^{-08}$ | $A8 = -3.99480 \times 10^{-08}$ |
| $A10 = 1.61759 \times 10^{-10}$ | $A10 = 1.03893 \times 10^{-09}$ |

EXAMPLE 10

Figure 23:
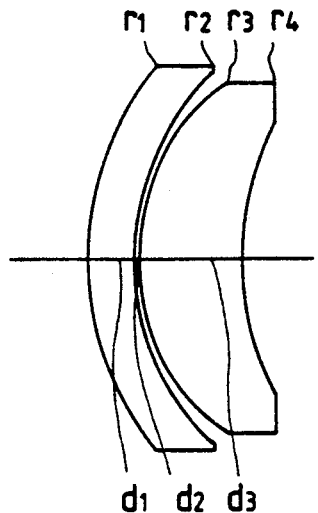
FIG. 23 is a cross-sectional view showing a tenth example of the invention.
Figure 24:
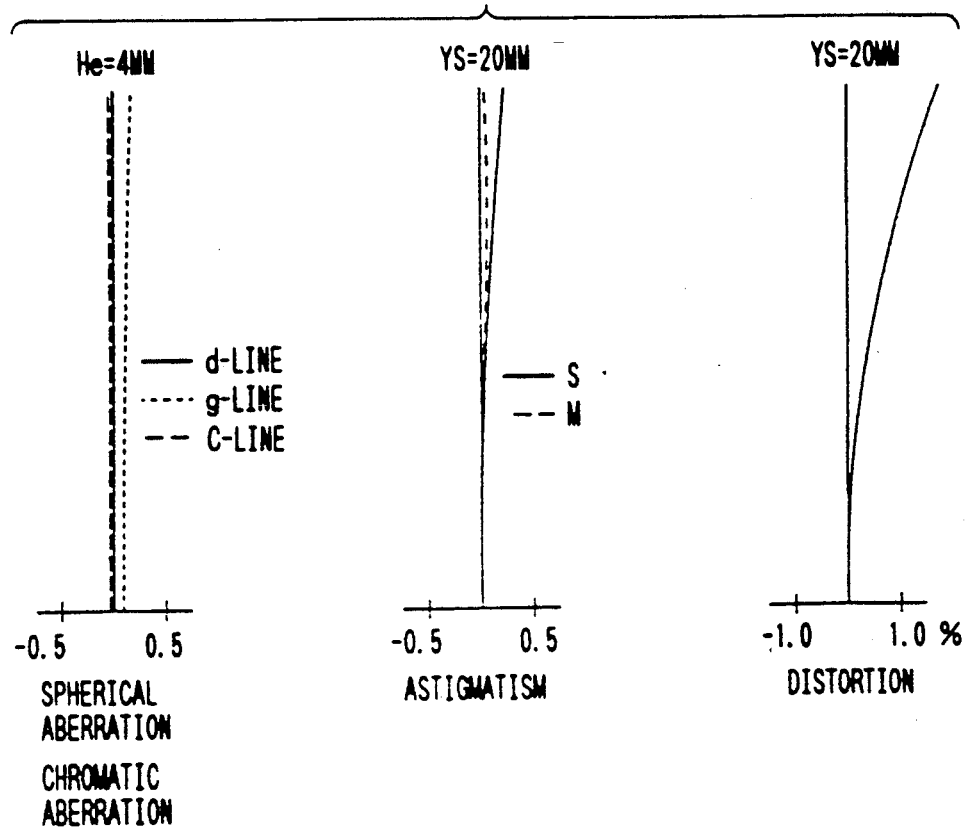
FIG. 24 is a graphs showing aberrational curves according to the tenth example.

FIG. 23 shows Example 10 of the invention.
Its numerical data is shown in Table 10 and its aberration curves are shown in FIG. 24.

TABLE 10

| f = 70.0 | diopter = −1.09D | ds = 73.2 | de = 15.0 |
|---|---|---|---|

| Surface No. | r | d | n | ν |
|---|---|---|---|---|
| 1 | 15.298 | 1.916 | 1.58547 | 29.9 |
| 2 | 11.253 | 0.192 | | |
| 3 | 9.520 | 4.694 | 1.49176 | 57.4 |
| 4 | 17.319 | | | |

Aspherical Coefficient

| 1st Surface | 4th Surface |
|---|---|
| $K = -0.54205$ | $K = -1.25819$ |
| $A4 = 4.63576 \times 10^{-05}$ | $A4 = 1.85109 \times 10^{-04}$ |
| $A6 = 4.47675 \times 10^{-07}$ | $A6 = 2.18207 \times 10^{-06}$ |
| $A8 = -1.98793 \times 10^{-09}$ | $A8 = -9.44950 \times 10^{-09}$ |
| $A10 = 3.91260 \times 10^{-11}$ | $A10 = 6.45228 \times 10^{-10}$ |

EXAMPLE 11

Figure 25:
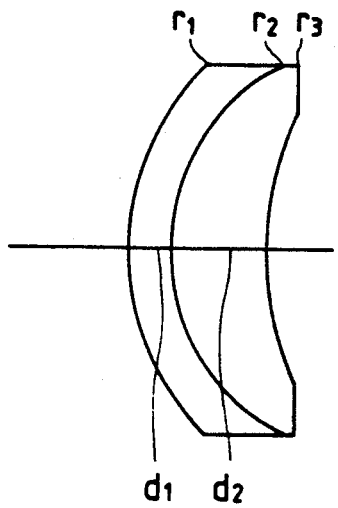
FIG. 25 is a cross-sectional view showing an eleventh example of the invention.
Figure 26:
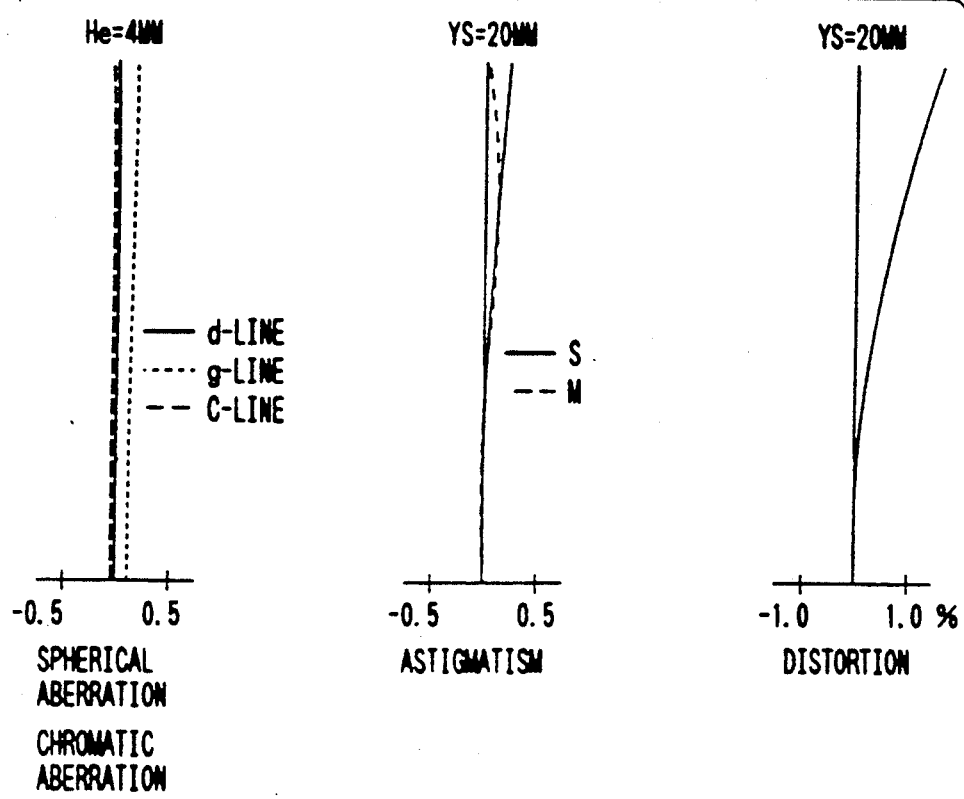
FIG. 26 is graphs showing aberrational curves according to the eleventh example.

FIG. 25 shows Example 11 of the invention.
Its numerical data is shown in Table 11 and aberration curves are shown in FIG. 26.

TABLE 11

| f = 70.0 | diopter = −1.00D | ds = 74.2 | de = 15.0 |
|---|---|---|---|

| Surface No. | r | d | n | ν |
|---|---|---|---|---|
| 1 | 12.350 | 1.913 | 1.58547 | 29.9 |
| 2 | 9.435 | 4.203 | 1.49176 | 57.4 |
| 3 | 17.297 | | | |

Aspherical Coefficient

| 1st Surface | 3rd Surface |
|---|---|
| $K = -0.40430$ | $K = -1.60550$ |
| $A4 = 5.02756 \times 10^{-05}$ | $A4 = 1.51026 \times 10^{-04}$ |
| $A6 = 7.05573 \times 10^{-07}$ | $A6 = 1.91786 \times 10^{-06}$ |
| $A8 = -5.38020 \times 10^{-09}$ | $A8 = -1.85136 \times 10^{-08}$ |
| $A10 = 9.52128 \times 10^{-11}$ | $A10 = 6.07463 \times 10^{-10}$ |

The relationship between each of Examples 3 to 11 and each condition is shown.

| | Conditions | | | | | | |
|---|---|---|---|---|---|---|---|
| Ex. | (1') | (2') | (3') | (4') | (5') | (6) | (7) |
| 4 | 0.0034 | 0.0044 | −3.0 | 0.322 | 0.096 | 4.7 | 0.722 |
| 5 | 0.0038 | 0.0046 | −3.0 | 0.315 | 0.095 | 4.9 | 0.719 |
| 6 | 0.0042 | 0.0050 | −3.0 | 0.315 | 0.093 | 4.8 | 0.730 |
| 7 | 0.0051 | 0.0047 | −4.4 | 0.266 | 0.082 | 8.3 | 0.316 |
| 8 | 0.0038 | 0.0043 | −5.9 | 0.244 | 0.086 | 7.9 | 0.130 |
| 9 | 0.0044 | 0.0048 | −6.0 | 0.244 | 0.089 | 9.7 | 0.128 |
| 10 | 0.0038 | 0.0042 | −3.4 | 0.247 | 0.067 | 6.6 | 0.795 |
| 11 | 0.0042 | 0.0036 | −3.4 | 0.247 | 0.060 | 7.5 | 0.777 |

Figure 27:
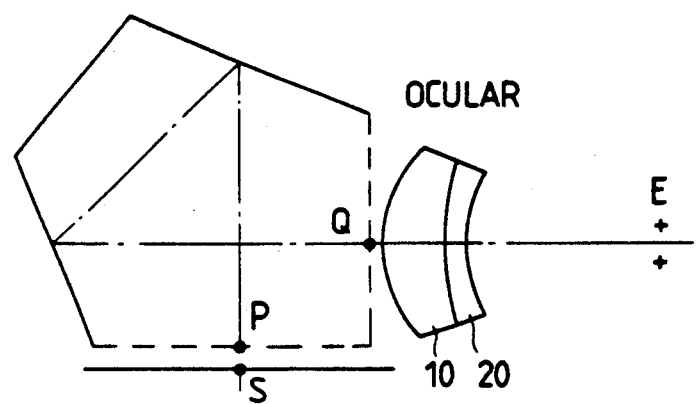
FIG. 27 is an illustration of a finder system for an SLR camera to which still another ocular system according to the invention is applied.
Figure 28:
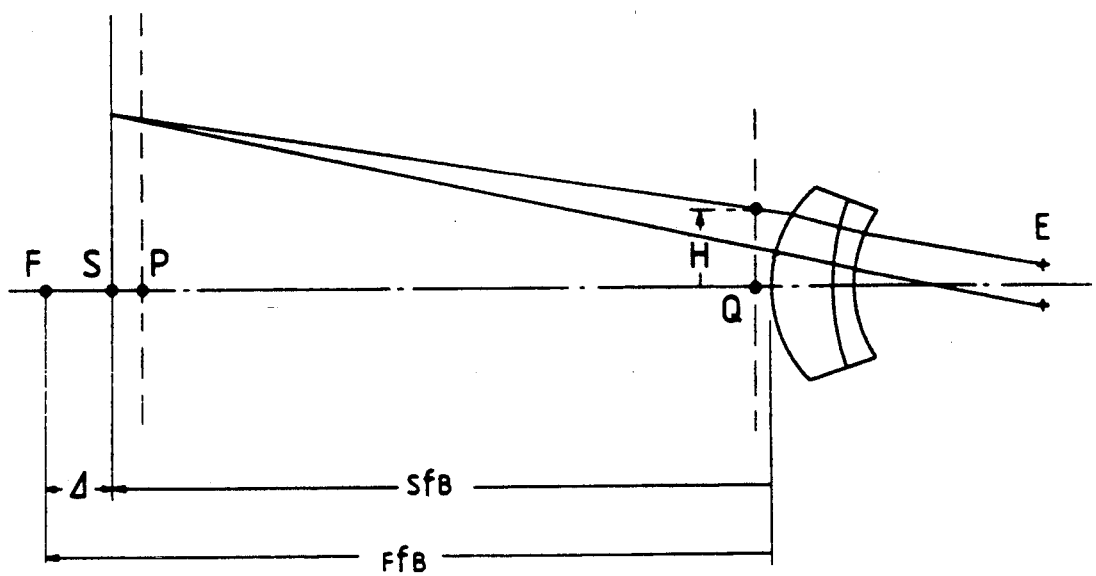
FIG. 28 shows an optical path obtained by developing the penta-mirror shown in FIG. 27.
Figure 29:
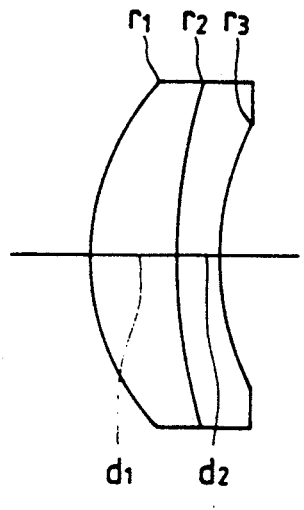
FIG. 29 is a cross-sectional view showing a twelfth example of the invention.

FIGS. 27 and 28 show still another embodiment of the invention. In this embodiment, the same reference characters are used to indicate the same parts or elements as those used in the preceding embodiments. In this embodiment, the ocular lens system is composed, in order from the pupil side, of a negative meniscus lens 20 whose concave surface is directed to the pupil, and a positive meniscus lens 10 whose convex surface is directed to the screen. The convex surface of the positive meniscus lens 10 and the concave surface of the negative meniscus 20 lens are aspherical. These aspherical surfaces are shifted toward the pupil from the reference spherical surface defined by the paraxial radius of curvature. With such an arrangement, it is possible to ensure substantially the same effect as that of the previous embodiments.

The respective lens elements should preferably meet the following conditions (3") and (6"):

$$-5 < (rps + rpe)/(rps - rpe) \leq -2 \quad (3'')$$

$$3 \leq (rns + rne)/(rns - rne) < 7 \quad (6'')$$

where rps is the radius of curvature of the paraxial ray of the surface, on the screen side, of the positive meniscus lens; rpe is the radius of curvature of the paraxial ray of the surface, on the pupil side, of the positive meniscus lens; rns is the radium of curvature of the paraxial ray of the surface, on the screen side, of the negative meniscus lens; and rne is the radius of curvature of the paraxial ray of the surface, on the pupil side, of the negative meniscus lens.

The conditions (3") and (6") relate to the contours of the positive and negative meniscus lenses. If the upper limit of the condition (3") is exceeded, the curvature of the lens is small, so that it would be difficult to increase the backfocus as well as to suppress the height of the flux of the maximum off-axis ray. If the lower limit of the condition (3″) is exceeded, the refractive power of both surfaces is excessive, so that it is difficult to effect the aberration compensation and a high order flare is generated.

If the condition (6″) is exceeded, it would be insufficient to compensate for the aberration generated in the positive meniscus lens. If the lower limit is exceeded, the compensation is excessive so that it is difficult to compensate for a high order flare.

Also, it is preferable that the aspherical surfaces meet the following conditions (1″) and (2″):

$$0.001 < \Delta Xp/f < 0.009 \quad (1'')$$

$$0.001 < \Delta Xn/f < 0.009 \quad (2'')$$

The conditions (1″) and (2″) are similar to the conditions (2) and (1), respectively, and have substantially the same effects as the conditions (2) and (1).

Preferably, the ocular lens meets the following conditions (4″), (8) and (9):

$$0.15 < rne/f < 0.37 \quad (4'')$$

$$0.05 < da/f < 0.15 \quad (8)$$

$$dc/f < 0.02 \quad (9)$$

where rne is the radius of the curvature of the paraxial ray of the concave surface of the negative meniscus lens; da is the distance from the first surface to the final surface; and dc is the interval between the positive and negative meniscus lenses.

The condition (4″) relates to the radius of curvature of the concave surface of the negative meniscus lens. If the upper limit is exceeded, it is difficult to increase the backfocus while keeping a short focal length. Also, if the lower limit is exceeded, the flare of the off-axis ray would increase, and since the radius of curvature on the pupil side is short, the eye point would be small.

The condition (8) relates to the distance from the first surface to the final surface of the ocular lens. If the upper limit is exceeded, the diameter of the lens increases, which will not lead to the miniaturization. If the lower limit is exceeded, in order to reduce the focal length, it is necessary to reduce the radius of curvature of each lens surface, and it would be difficult to compensate for the aberration.

The condition (9) relates to the air space between the positive and negative meniscus lenses. If the upper limit is exceeded, the off-axis marginal ray is dispersed at the negative meniscus lens. It is therefore necessary to use a large diameter lens.

The negative meniscus lens preferably meets the following condition (7″):

$$0.5 < f/|fn| < 1.2 \quad (7'')$$

where fn is the focal length of the negative meniscus lens.

The condition (7″) defines the refractive power of the negative meniscus lens. If the lower limit is exceeded, the compensation for the chromatic aberration with the negative meniscus lens would not be effected. If the upper limit is exceeded, the power of the negative meniscus lens is excessive to generate a high order flare.

Incidentally, in the following two examples, the positive meniscus lens is made of acrylic resin, and the negative meniscus lens is made of polycarbonate resin.

EXAMPLE 12

FIG. 27 shows Example 12.

Figure 30:
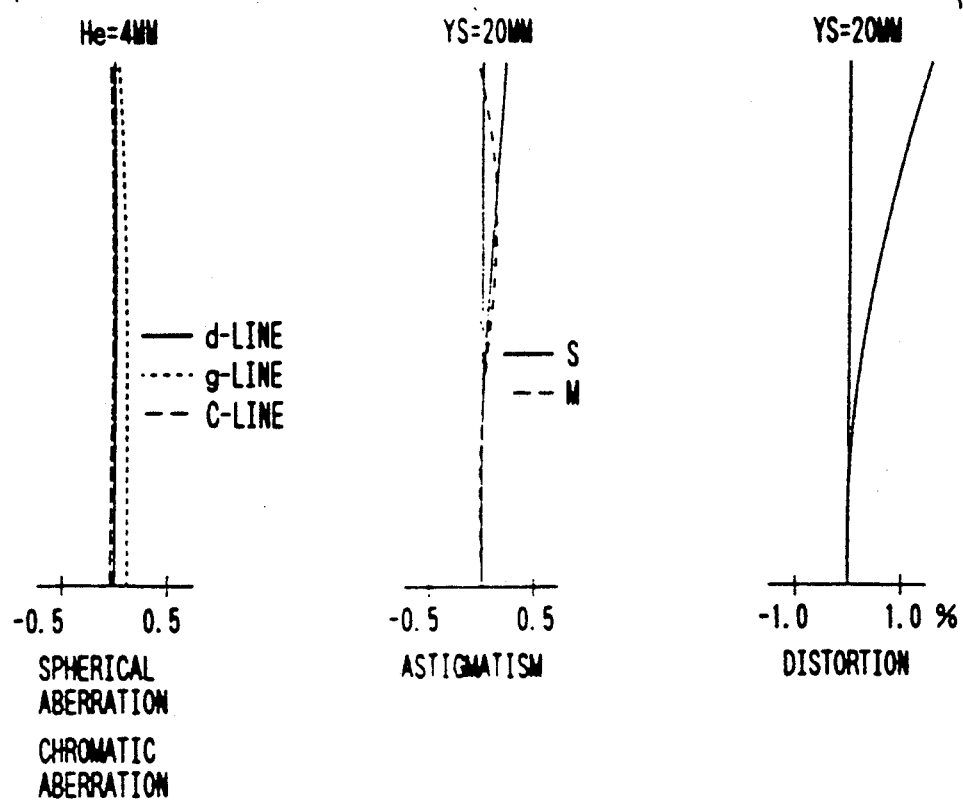
FIG. 30 is graphs showing aberrational curves according to the twelfth example.

Its numerical data are shown in Table 12 and aberration curves are shown in FIG. 30.

TABLE 12

| f = 70.0 | diopter = −1.04D | ds = 74.2 | de = 15.0 |
|---|---|---|---|
| Surface No. | r | d | n | ν |
| 1 | 11.906 | 3.984 | 1.49176 | 57.4 |
| 2 | 26.888 | 1.913 | 1.58547 | 29.9 |
| 3 | 16.252 | | | |

Aspherical Coefficient

| 1st Surface | 3rd Surface |
|---|---|
| K = −0.29850 | K = −1.43843 |
| A4 = 5.13526 × 10$^{-05}$ | A4 = 1.50187 × 10$^{-04}$ |
| A6 = 1.25913 × 10$^{-06}$ | A6 = 2.86458 × 10$^{-06}$ |
| A8 = −1.51779 × 10$^{-08}$ | A8 = −4.70970 × 10$^{-08}$ |
| A10 = 2.30410 × 10$^{-10}$ | A10 = 1.16018 × 10$^{-09}$ |

EXAMPLE 13

Figure 31:
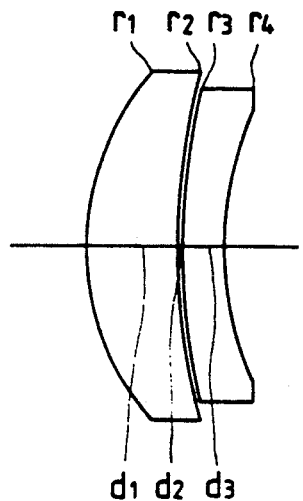
FIG. 31 is a cross-sectional view showing a thirteenth example of the invention.

FIG. 31 shows Example 13.

Figure 32:
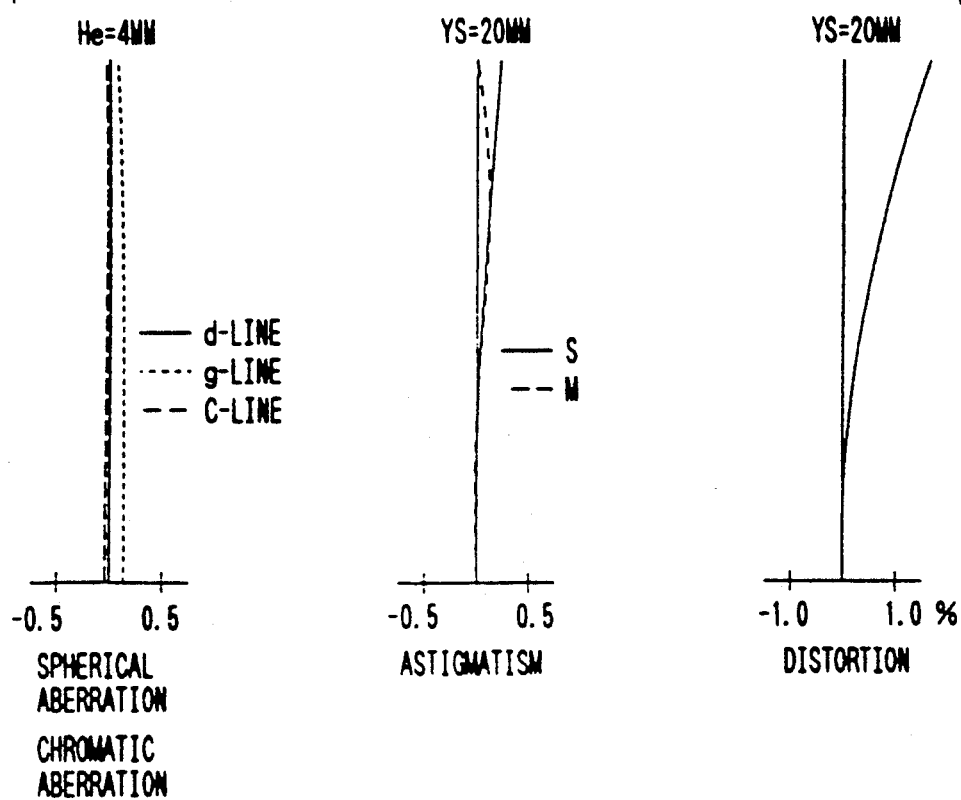
FIG. 32 is graphs showing aberrational curves according to the thirteenth example.

Its numerical data is shown in Table 13 and aberration curves are shown in FIG. 32.

TABLE 13

| f = 70.0 | diopter = −0.98D | ds = 74.2 | de = 15.0 |
|---|---|---|---|
| Surface No. | r | d | n | ν |
| 1 | 12.491 | 4.112 | 1.49176 | 57.4 |
| 2 | 28.614 | 0.193 | | |
| 3 | 28.057 | 1.914 | 1.58547 | 29.9 |
| 4 | 17.305 | | | |

Aspherical Coefficient

| 1st Surface | 4th Surface |
|---|---|
| K = −1.62656 | K = −0.33877 |
| A4 = 1.38578 × 10$^{-04}$ | A4 = 4.99719 × 10$^{-05}$ |
| A6 = 1.88970 × 10$^{-06}$ | A6 = 8.70092 × 10$^{-07}$ |
| A8 = −2.29631 × 10$^{-08}$ | A8 = −8.36353 × 10$^{-09}$ |
| A10 = 6.45557 × 10$^{-10}$ | A10 = 1.32775 × 10$^{-10}$ |

The numerical calculations base on the conditions (3″), (6″), (2″), (8), (9) and (7″) shown below.

| Conditions | Example 12 | Example 13 |
|---|---|---|
| (3″) | −2.6 | −2.6 |
| (6″) | 4.1 | 4.2 |
| (1″) | 0.0044 | 0.0031 |
| (2″) | 0.0037 | 0.0037 |
| (4″) | 0.23 | 0.25 |
| (8) | 0.084 | 0.089 |
| (9) | 0 | 0.0028 |
| (7″) | 0.93 | 0.85 |

We claim:

1. An ocular lens system comprising a single positive meniscus lens having aspherical surfaces on both sides, wherein a concave surface of said meniscus lens is directed toward the pupil, said meniscus lens is disposed at a position closest to the pupil, and each of said aspherical surfaces are offset toward the pupil from a respective spherical virtual reference surface which is defined by a paraxial radius of curvature of a respective one of said aspherical surfaces, said meniscus lens satisfying the following conditions, $$0.001 < \Delta Xs/f < 0.009$$

$$0.001 < \Delta Xe/f < 0.009$$

where $\Delta Xs$ is the distance from the one of said virtual reference surfaces which is on the screen side to the corresponding one of said aspherical surfaces (at a co-ordinate of $Y=0.112f$);

$\Delta Xe$ is the distance from the one of said virtual reference surfaces which is on the pupil side to the corresponding one of said aspherical surfaces (at a co-ordinate of $Y=0.086f$);

$Y$ is the height from the optical axis; and $f$ is the focal length of the ocular lens system.

2. The system according to claim 1, further meeting the following conditions:

$$-12 < (rs+re)/(rs-rd) < -3$$

$$0.15 < re/f < 0.35$$

$$0.05 < d/f < 0.15$$

where rs is the paraxial radius of curvature of the surface on the screen side;

re is the paraxial radius of curvature of the surface on the pupil side;

d is the thickness of the lens.

3. The system according to claim 1, wherein said positive meniscus lens is made of acrylic resin.

4. An ocular lens composed of at least one positive lens, for use with a penta-mirror, said ocular lens comprising:

a single positive meniscus lens disposed at a position closest to a pupil and having both aspherical surfaces with a concave surface thereof being directed to the pupil, and each of the aspherical surfaces is offset toward the pupil from a respective spherical virtual reference surface which is defined by a paraxial radius of curvature of a respective one of said aspherical surfaces, said meniscus lens satisfying the following conditions, $$0.001 < \Delta Xs/f < 0.009$$

$$0.001 < \Delta Xe/f < 0.009$$

where $\Delta Xs$ is the distance from the one of said virtual reference surfaces which is on the screen side to the corresponding one of said aspherical surfaces (at a co-ordinate of $Y=0.112f$);

$\Delta Xs$ is the distance from the one of said virtual reference surfaces which is on the pupil side to the corresponding one of said aspherical surfaces (at a co-ordinate of $Y=0.086f$);

$Y$ is the height from the optical axis; and $f$ is the focal length of the ocular lens system.

5. An ocular lens system comprising, in order from the pupil side, a positive meniscus lens whose concave surface is directed to the pupil side and a negative meniscus lens whose convex surface is directed to the object side, wherein at least the convex surface of said negative meniscus lens and the concave surface of said positive meniscus lens are aspherical, and each of said aspherical surfaces is offset toward the pupil from a respective spherical virtual reference surface defined by a paraxial radius of curvature of a respective one of said aspherical surfaces, said system further meeting the following conditions:

$$0.001 < \Delta Xn/f < 0.009$$

$$0.001 < \Delta Xp/f < 0.009$$

where $\Delta Xn$ is the distance from a respective one of said virtual reference surfaces at a marginal portion of the convex surface of said negative meniscus, lens to the lens surface of said negative meniscus lens;

$\Delta Xp$ is the distance from a respective one of said virtual reference surfaces, at a marginal portion of the concave surface of said positive meniscus lens, to the lens surface of said positive meniscus lens; and $f$ is the overall focal length.

6. The system according to claim 5, further meeting the following conditions:

$$-7 < (rps+rpe)/(rps-rpe) < -2$$

$$0.15 < rpe/f < 0.37$$

$$0.03 < dp/f < 0.15$$

wherein rps is the paraxial radius of curvature of the surface, on the screen side, of said positive meniscus lens;

rpe is the paraxial radius of curvature of the surface, on the pupil side, of said positive meniscus lens;

$f$ is the focal length of the ocular lens system; and dp is the thickness of the positive meniscus lens.

7. The system according to claim 7, further meeting the following conditions:

$$3 < (rns+rne)/(rns-rne) < 15$$

$$0.05 < f/|fn| < 0.9$$

where rns is the paraxial radius of curvature of the surface, on the screen side, of said negative meniscus lens;

rne is the paraxial radius of curvature of the surface, on the pupil side, of said negative meniscus lens;

fn is the focal length of said negative meniscus lens; and $f$ is the overall focal length.

8. The system according to claim 5, wherein said positive meniscus lens is made of acrylic resin.

9. The system according to claim 5, wherein said negative meniscus lens is made of polycarbonate resin.

10. The system according to claim 5, wherein said positive meniscus lens and said negative meniscus lens are cemented together.

11. An ocular lens for use with a penta-mirror, including at least two lens elements of a positive meniscus lens and a negative meniscus lens, said ocular lens comprising, in order from the pupil side, a positive meniscus lens whose concave surface is directed to the pupil side and a negative meniscus lens whose convex surface is directed to object, a convex surface of said negative meniscus lens and a concave surface of said positive meniscus lens being aspherical, said two surfaces each being offset toward the pupil from a respective spherical virtual reference surface which is defined by a paraxial radius of curvature of a respective one of said aspherical surfaces, said system further meeting the following conditions:

$$0.001 < \Delta Xn/f < 0.000$$

$$0.001 < \Delta Xp/f < 0.009$$

where
- $\Delta Xn$ is the distance from a respective one of said virtual reference surfaces at a marginal portion of the convex surface of said negative meniscus, lens to the lens surface of said negative meniscus lens;
- $\Delta Xp$ is the distance from a respective one of said virtual reference surfaces, at a marginal portion of the concave surface of said positive meniscus lens, to the lens surface of said positive meniscus lens; and
- f is the overall focal length.

12. An ocular lens system comprising, in order from the pupil said, a positive meniscus lens whose concave surface is directed to the pupil side and whose convex surface is directed to the object side and a negative meniscus lens wherein at least the convex surface and the concave surface of said positive meniscus lens are aspherical, and each of said aspherical surfaces is offset toward the pupil from a respective spherical virtual reference surface which is defined by a paraxial radius of curvature of a respective one of said aspherical surfaces, said system further meeting the following conditions:

$$0.001 < \Delta Xp/f < 0.009$$

where
- $\Delta Xp$ is the distance from a respective one of said reference spherical surfaces at a marginal portion of each of the concave surface and the convex surface of said positive meniscus lens to a respective lens surface of said positive meniscus lens; and
- f is the overall focal length.

13. The system according to claim 12, further meeting the following conditions $$-7 < (rps+rpe)/(rps-rpe) < -2$$

$$0.15 < rpe/f < 0.37$$

$$0.03 < dp.f < 0.15$$

wherein
- rps is the paraxial radius of curvature of the surface, on the screen side, of said positive meniscus lens;
- rpe is the paraxial radius of curvature of the surface, on the pupil side, of said positive meniscus lens;
- f is the focal length of the ocular lens system; and
- dp is the thickness of the positive meniscus lens.

14. The system according to claim 12, wherein said positive meniscus lens is made of acrylic resin.

15. The system according to claim 12, wherein said negative meniscus lens is made of polycarbonate resin.

16. The system according to claim 12, wherein said positive meniscus lens and said negative meniscus lens are cemented together.

17. An ocular lens for use with a penta-mirror, including at least two lens elements of a positive meniscus lens and a negative meniscus lens, said ocular lens comprising, in order from the pupil side, a positive meniscus lens and a negative meniscus lens whose convex surface is directed to the object and whose concave surface is directed to the pupil side, said concave surface and said convex surface of said positive meniscus lens being aspherical, said two surfaces being offset towards the pupil from a respective spherical virtual reference surface which is defined by a paraxial radius of curvature of a respective one of said aspherical surfaces, said system further meeting the following conditions:

$$0.001 < \Delta Xp/f < 0.009$$

where
- $\Delta Xp$ is the distance from a respective one of said reference spherical surfaces at a marginal portion of each of the concave surface and the convex surface of said positive meniscus lens to a respective lens surface of said positive meniscus lens; and
- f is the overall focal length.

18. An ocular lens system comprising, in order from the pupil side, a negative meniscus lens whose concave surface is directed to the pupil side and a positive meniscus lens whose convex surface is directed to the screen side, at least said convex surface of said positive meniscus lens and said concave surface of said negative meniscus lens being aspherical, the aspherical surfaces being offset toward the pupil side from a respective spherical virtual reference surface which is defined by a paraxial radius of curvature of a respective one of said aspherical surfaces, said lens system satisfying the following relationships:

$$-5 < (rps+rpe)/(rps-rpe) \leq -2$$

$$3 \leq (rns+rns)/(rns-rne) < 7$$

where
- rps is the paraxial radius of curvature of the surface, on the screen side, of said positive meniscus lens;
- rpe is the paraxial radius of curvature of the surface, on the pupil side, of said positive meniscus lens;
- rns is the paraxial radius of curvature of the surface, on the screen side, of said negative meniscus lens; and
- 'rne is the paraxial radius of curvature of the surface, on the pupil side, of said negative meniscus lens.

19. The system according to claim 18, further meeting the following conditions:

$$0.001 < \Delta Xp/f < 0.009$$

$$0.001 < \Delta Xn/f < 0.009$$

where
- $\Delta Xp$ is the distance from a respective one of said virtual reference surfaces, at the marginal portion of the convex surface of the positive meniscus lens, to the lens surface of said positive meniscus lens;
- $\Delta Xn$ is the distance from a respective one of said virtual reference surfaces, at the marginal portion of the concave surface of the negative meniscus lens to the lens surface of said negative meniscus lens;
- f is the focal length of the ocular lens system; and
- dc is the space between the positive and negative meniscus lenses.

20. The system according to claim 18, further meeting the following conditions:

$$0.15 < rne/f < 0.37$$

$$0.05 < da/f < 0.15$$

$dc < 0.02$ where
- rne is the paraxial radius of curvature of the concave surface of the negative meniscus lens;
- da is the distance from the first surface to the final surface;
- f is the focal length of the ocular lens system; and
- dc is the space between the positive and negative meniscus lenses.

21. The system according to claim 18, further meeting the following condition:

$0.5 < f/|fn| < 1.2$ where
- is the overall focal length; and
- fn is the focal length of the negative meniscus lens.

22. The system according to claim 18, wherein said positive meniscus lens is made of acrylic resin.

23. The system according to claim 18, wherein said negative meniscus lens is made of polycarbonate resin.

24. The system according to claim 18, wherein said positive meniscus lens and said negative meniscus lens are cemented together.

25. An ocular lens system for use with a penta-mirror, including two lens elements, said system comprising, in order form the pupil side, a negative meniscus lens whose concave surface is directed to the pupil, and a positive meniscus lens whose convex surface is directed to the screen, at least the convex surface of said positive meniscus lens and the concave surface of said negative meniscus lens being aspherical, the aspherical surface being offset toward the pupil from a respective spherical virtual reference surface which is defined by a paraxial radius of curvature of a respective one of said aspherical surfaces, said lens system satisfying the following relationships.

$-5 < (rps + rpe)/(rps - rpe) \leq -2$ $3 \leq (rns + rne)/(rns - rne) < 7$ where
- rps is the paraxial radius of curvature of the surface, on the screen side, of said positive meniscus lens;
- rpe is the paraxial radius of curvature of the surface, on the pupil side, of said positive meniscus lens;
- rns is the paraxial radius of curvature of the surface, on the screen side, of said negative meniscus lens; and
- rne is the paraxial radius of curvature of the surface, on the pupil side, of said negative meniscus lens.

* * * * *